Aug. 26, 1958 W. F. WENDT 2,848,724

HOOK FORMING PLIERS

Filed July 15, 1957

INVENTOR.
Walter F. Wendt.
BY
Wupper, Gradolph & Love
attys.

United States Patent Office 2,848,724

Patented Aug. 26, 1958

2,848,724

HOOK FORMING PLIERS

Walter F. Wendt, Chicago, Ill., assignor to Mathias Klein & Sons, Chicago, Ill., a corporation of Illinois Application July 15, 1957, Serial No. 672,086

3 Claims. (Cl. 7—5.6)

The present invention relates to pliers used in the mechanical assembly, in preparation for soldering, of electronic circuitry such as that used in radios, television sets, and similar electronic devices. As a practical matter, it is necessary in the assembly of such electronic devices on either an individual or a mass production basis to manually cut the individual leads from resistors, capacitors and other components to the exact lengths required in each assembly and bend the lead ends around coacting terminals. The most satisfactory technique previously developed for making such connections on an assembly line necessitates the use of diagonal pliers or a suitable substitute to cut each component lead to the length required in the particular assembly into which it is to be connected. Then the end of the lead is grasped between the gripping surfaces at the end of long nose pliers and shaped into a hook. This hook is immediately hooked into or around a terminal and crimped together by the pliers to form a mechanical connection with the terminal, which is soldered later. Aside from the time required to make the component connections in this manner, the connections made are not uniform because of differences in the size of the hooks fashioned in the component leads. Inconsistencies in hook size arise from variations in the length of the end portions of the leads which are grasped in the long nose pliers to form the hooks. A technique for making such connections with considerably greater efficiency and with unvarying uniformity has been made available by improved pliers provided specifically for this purpose by the present invention.

Accordingly, one object of the present invention is to provide, for mechanically assembling the electrical components of electronic circuitry in preparation for soldering, improved pliers of simple construction which operate upon being closed against a lead wire from an electrical component and rotated relative to the component end of the lead wire to (1) efficiently cut the wire to an exact length determined by the position of the pliers along the wire, (2) accurately measure from the severed end of the wire a longitudinal segment of the wire having a precise predetermined length which will form a hook of desired size on the lead, (3) sharply bend the precisely measured end segment of the lead wire back on the lead wire through an angle substantially greater than ninety degrees to form a hook, and (4) positively limit the degree of bend between the measured end segment and the adjoining portion of the lead thereby determining with great accuracy the open angle of the hook formed on the lead.

Other objects and advantages will become apparent from the following description of the exemplary form of the invention shown in the drawings, in which.

Figures 1, 2:
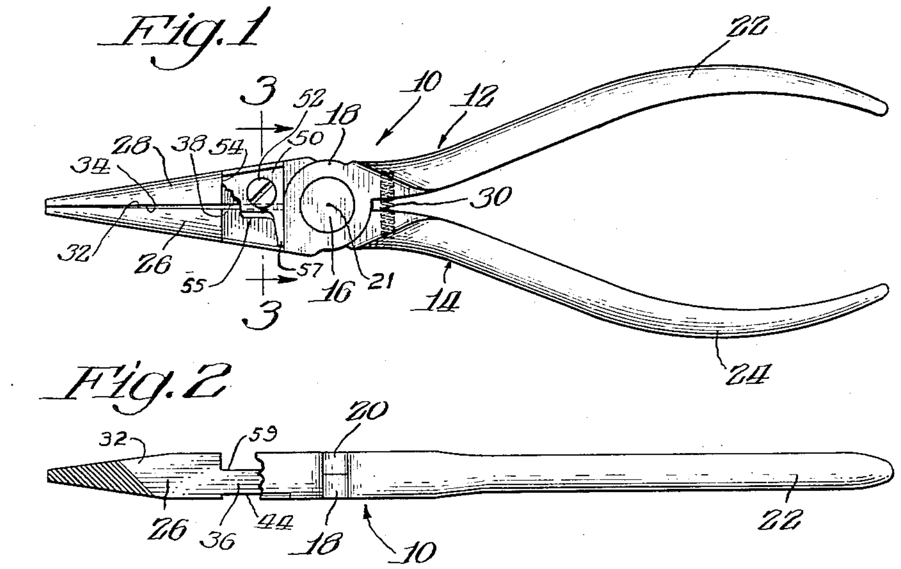
Figure 1 is a side view of the improved pliers in which the shearing blade has been partially broken away to reveal underlying structure.
Fig. 2 is a longitudinal edge view of the pliers in which one jaw is partially broken away to reveal opposing structure of the other jaw.

The long nose pliers 10 forming the exemplary embodiment of the invention illustrated in the drawings comprises a pair of levers 12, 14 disposed in crossing relation to each other and swingably connected together by a pivot pin 16 extending through two medial hinge sections 18, 20 of the respective levers. As received in the lever hinge sections 18, 20, the pin 16 defines an axis 21 about which each of the levers 12, 14 pivots in relation to the other lever. The hinge axis is indicated in Fig. 1 by the dot identified by the numeral 21.

The ends of the two levers which extend to one side of the pivot 16, as shown in Fig. 1, are shaped into a pair of opposed handles 22, 24 adapted to be gripped simultaneously in one hand of the user.

The opposite ends of the levers 12, 14 are shaped into an opposing pair of long nose jaws 26, 28, which are tapered toward each other and narrowed at the ends, as shown in Figs. 1 and 2, to give the tool the overall shape and appearance of conventional "long nose" or "needle nose" pliers. The length of the jaws 26, 28 is approximately one-half that of the handles 22, 24. A compression spring 30 inserted between the hinge section ends of the handles 12, 14 urges the handles apart to swing the jaws 26, 28 away from each other.

The longitudinal sides of the two jaws 26, 28 which oppose each other define, respectively, two flat surfaces 32, 34 extending the full length of the jaws. Both surfaces 32, 34 are parallel to the hinge axis 21. Orientation of the surfaces 32, 34 on the jaws 26, 28 is such that the surfaces have a substantially parallel relation to each other upon closing of the jaws to bring the surfaces into mutual engagement at the projecting ends of the jaws.

As shown in Fig. 2, the flat jaw surface 32 is serrated from the free end of the jaw 26 for a substantial distance along the surface to form a general purpose wire gripping face (denoted by the same reference numeral 32) opposing a similarly serrated portion of the other jaw surface 34, which forms a coacting gripping face (also denoted by the numeral 34).

Figure 3:
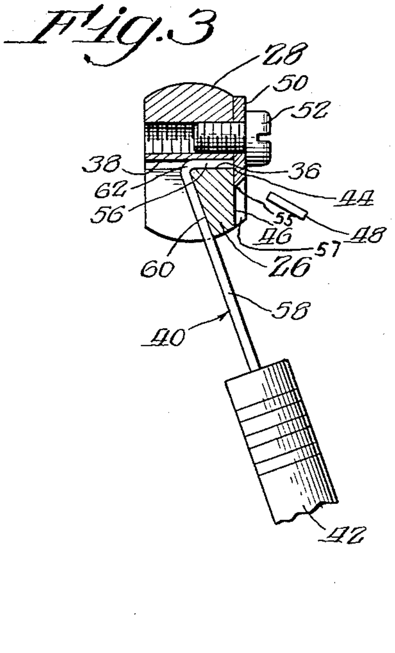
Fig. 3 is a cross sectional view taken with reference to the line 3—3 of Fig. 1 and showing the completion of a hook in a resistor lead.

A longitudinal segment of the flat jaw surface 32 extending along nearly one third of the length of the jaw 26 from the hinge section or base end of the jaw is narrowed in a specific manner, to be described presently, to form an anvil face 36, Figs. 2 and 3, having an exact width throughout its length that is equal to the length of the end portion of an electronic component lead wire which makes a most efficient connecting hook when bent back on the adjacent shank of the wire. These relationships will be pointed out more specifically in the ensuing description of the technique of using the tool.

The anvil face 36 is opposed by a clamping face 38 formed by the opposing longitudinal portion of the other jaw surface 34.

After being placed across the anvil face 36, as shown in Fig. 3, a lead wire 40 from an electrical resistor 42, for example, is pressed hard against the anvil face 36 by the clamping face 38. Moreover, this clamping of the wire 40 is achieved by the same gripping or closing action of the pliers 10, which serves to cut the lead wire to a desired length just before full clamping pressure is applied to the wire.

Designed to avoid interference with full utilization of the maximum gripping force of the pliers 10 to clamp a lead wire 40 between the anvil face 36 and the clamping face 38, the plier structure used to cut the lead to the desired length is very simple in construction and extremely efficient in operation. Thus, as shown in Figs. 2 and 3, a right-angled shearing edge 44 is formed on one side of the jaw 26 at the intersection of the anvil face 36 with a slightly recessed, flat shearing face or surface 46 on the jaw, which is perpendicular to the hinge axis 21. Both the shearing face 46 and the shearing edge 44 extend the full length of the anvil face 36.

The portion 48 of a lead wire 40 which projects from the anvil face 36 beyond the shearing face 46 is sheared off at the edge 44 by a flat shearing blade or knife 50 substantially parallel to the shearing face 46. The blade 50 is secured to the opposing portion of the other jaw 28 by a single screw 52 which holds the blade in a shallow recess 54 milled into the supporting jaw.

Thus supported, the blade 50 projects from the jaw 28 to slidably overlap the shearing face 46 when the two jaws 26, 28 are swung together. A shearing edge 55 is formed on the projecting end of the blade 50 to extend across nearly the full width of the blade and to have a substantially parallel relation to the jaw shearing edge 44 when the two shearing edges cross upon movement of the jaws 26, 28 toward each other. A tang 57 projects from the hinge section edge of the blade 50 to overlap the shearing face 46 even when the jaws 22, 28 are fully open, thus serving to guide the blade edge 55 across the jaw edge 44 as the jaws are swung together.

As shown most clearly in Fig. 3, the blade edge 55 projects a sufficient distance beyond the clamping surface 38 to shear off a wire 40 of substantial size and overlap the shearing face 46 before the clamping surface is fully engaged with the portion 56 of the wire which extends across the anvil surface 44. Continuation of the same closing or gripping action of the pliers 10, which cuts the wire 40 to a length determined by the position of the pliers along the wire, also clamps the unsevered end of the wire.

The unsevered end portion 56 of the wire 40 thus clamped in the tool is accurately measured across the anvil face 36 from the shearing edge 44 to a bending edge 59, Fig. 2, parallel to and extending along the length of the shearing edge 44. The bending edge 59 is formed by the slightly rounded intersection of the anvil face 36 with a flat abutment surface 60 on the jaw 26, which defines with the anvil face an included angle of sixty degrees. To form the abutment surface 60 on a proper angle and to provide the proper spacing between the shearing edge 44 and the bending edge 59, the hinge section end of the jaw 26 is milled away on the side opposite from the shearing face 46 and beveled under the anvil face 36 as shown in Fig. 3. The average transverse depth of the lateral cut made in the jaw 26 in forming the abutment surface or face 60 is roughly equal to the width of the anvil face 36.

The previously described gripping action of the tool, which cuts a lead wire 40 to a desired length and firmly clamps a precisely measured end portion 56 of the unsevered wire, is followed through immediately by a partial rotation of the tool relative to electrical component 42, which is held in the other hand of the user.

This forms a sharp bend 62 between the measured end portion 56 of the wire 40 and the adjacent straight shank 58 of the wire. The wire is bent through an angle of exactly 120° as positively determined by engagement of the straight wire shank 58 with the abutment surface 60. This engagement of the shank 58 with the surface 60 is readily felt by the user, who immediately relaxes his grip on the handles 22, 24 to release the hook thus formed in the end of the wire 40.

In this manner, the length of the hook end 56 and the 60° angle between the hook end 56 and the shank 58 are both determined with unvarying accuracy by the structure of the tool so that the hook necessarily has the proper size and angle for efficient connection to an electrical connecting lug 64, for example. See Fig. 4.

Figure 4:
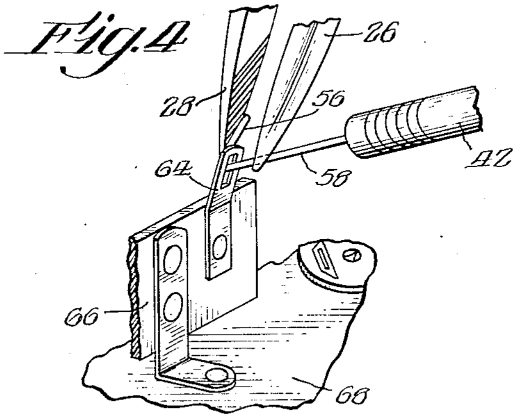
Fig. 4 is a fragmentary perspective view illustrating the manner in which a resistor lead hook formed by the pliers is crimped after being inserted through an electrical terminal.

As illustrated in Fig. 4, the hook end 56 is inserted through an apertured lug 64 on a terminal strip 66 supported on a radio or television chassis 68. The mechanical connection of the component 42 to the lug 64 is completed simply by crimping the hood end 56 against the lead shank 56 using the projecting ends of the plier jaws 26, 28 for this purpose.

While I have shown a preferred embodiment of my invention, it will be apparent that variations and modifications thereof may be made without departing from the underlying principles and scope of the invention. I therefore desire, by the following claims, to include all such variations and modifications by which substantially the results of my invention may be obtained through the use of substantially the same or equivalent means.

I claim:

1. Long nose pliers for forming and crimping hooks in electronic component lead wires, comprising, in combination, two crossing levers medially hinged together for swinging movement about a common hinge axis, said levers defining two opposed handles extending in one direction from said hinge axis and two opposed jaws extending in the other direction from said hinge axis, the projecting end of each jaw defining a gripping surface facing a similar gripping surface on the other jaw, the hinge axis portion of one of said jaws defining a flat anvil face extending a substantial distance longitudinally along the jaw and opposing the other jaw in parallel relation to said hinge axis, said other jaw defining a flat clamping face opposing said anvil face in parallel relation to said hinge axis, said end portion of said one jaw defining on one side thereof a shearing face substantially perpendicular to said hinge axis and intersecting said anvil face to define therewith a straight shearing edge having a substantial length along the jaw, said end portion of said one jaw being deeply undercut laterally from the side opposite from said shearing face to define an abutment face intersecting said anvil face to define therewith an included angle of approximately sixty degrees and to form at the intersection of said abutment face with said anvil face a straight bending edge parallel to said shearing edge and having a predetermined spacing therefrom, and a shearing blade fixed to said other jaw and projecting therefrom to shear across said jaw shearing edge and slidably overlap said shearing face upon closing of said jaws.

2. Long nose hook forming pliers comprising, in combination, two crossing levers medially hinged together for swinging movement about a common hinge axis, said levers defining two opposed handles extending in one direction from said hinge axis and two opposed jaws extending in the other direction from said hinge axis, the projecting end of each jaw defining a gripping surface parallel to said hinge axis and facing a similar gripping surface on the other jaw, a longitudinal portion of one of said jaws on the hinge axis end thereof defining a flat anvil face coplanar with the gripping surface on the jaw and extending a substantial distance therefrom toward said hinge axis, said other jaw defining a flat clamping face coplanar with said gripping surface thereon and opposing said anvil face of said one jaw, said longitudinal portion of said one jaw defining on one side thereof a shearing face substantially perpendicular to said hinge axis and intersecting said anvil face to define therewith a straight shearing edge having a substantial length along the jaw, said longitudinal portion of said one jaw being undercut laterally from the side opposite from said shearing face to define an abutment face intersecting said anvil face to define therewith an acute included angle and to form at the intersection of said abutment face with said anvil face a straight bending edge parallel to said shearing edge and having a predetermined spacing therefrom, and a shearing blade fixed to said other jaw and projecting therefrom to define a blade shearing edge which slides past said jaw shearing edge in adjacent substantially parallel relation thereto upon swinging of said jaws toward each other.

3. Hook forming pliers comprising, in combination, two crossing levers medially hinged together for swinging movement about a common hinge axis, said levers defining two opposed handles extending in one direction from said hinge axis and two opposed jaws extending in the other direction from said hinge axis, the projecting end of each jaw defining a gripping surface facing a similar gripping surface on the other jaw, a longitudinal portion of one of said jaws on the hinge axis end thereof defining a flat anvil face extending a substantial distance longitudinally along the jaw and opposing the other jaw in parallel relation to said hinge axis, said other jaw defining a flat clamping face opposing said anvil face in parallel relation to said hinge axis, said longitudinal portion of said one jaw defining on one side thereof a shearing face substantially perpendicular to said hinge axis and intersecting said anvil face to define therewith a straight shearing edge having a substantial length along the jaw, said longitudinal portion of said one jaw being undercut laterally from the side opposite from said shearing face to define an abutment face intersecting said anvil face to define therewith an acute included angle and to form at the intersection of said abutment face with said anvil face a straight bending edge parallel to said shearing edge and having a predetermined spacing therefrom, and a shearing blade fixed to said other jaw and projecting therefrom to define a blade shearing edge spaced a substantial distance from said clamping face and positioned to slide past said jaw shearing edge as said jaws move toward each other.

References Cited in the file of this patent

UNITED STATES PATENTS 2,097,735 Mrozinski -------------- Nov. 2, 1937